(12) United States Patent
Bester (10) Patent No.: US 10,706,406 B2
(45) Date of Patent: *Jul. 7, 2020

(54) METHOD AND A SYSTEM FOR AUTHENTICATING AND IDENTIFYING THE LOCATION OF A COMMUNICATION DEVICE

(71) Applicant: George Ernest Bester, Port-Louis (MU)

(72) Inventor: George Ernest Bester, Port-Louis (MU)

(*) Notice: Subject to any disclaimer, the term of this patent is extended or adjusted under 35 U.S.C. 154(b) by 162 days.

This patent is subject to a terminal disclaimer.

(21) Appl. No.: 15/960,640

(22) Filed: Apr. 24, 2018

(65) Prior Publication Data

US 2018/0240099 A1    Aug. 23, 2018

Related U.S. Application Data

(63) Continuation-in-part of application No. 15/151,528, filed on May 11, 2016, now Pat. No. 9,992,030.
(Continued)

(51) Int. Cl.
| | |
|---|---|
| *G06F 9/00* | (2006.01) |
| *H04L 12/26* | (2006.01) |
| *G06Q 20/32* | (2012.01) |
| *H04L 9/32* | (2006.01) |
| *H04L 9/14* | (2006.01) |
| *G06Q 20/40* | (2012.01) |
| *H04W 4/021* | (2018.01) |
| *G06Q 10/10* | (2012.01) |

(Continued)

(52) U.S. Cl.
CPC ........ *G06Q 20/3224* (2013.01); *G01S 5/0027* (2013.01); *G01S 19/01* (2013.01); *G01S 19/14* (2013.01); *G06Q 10/1091* (2013.01); *G06Q 20/3221* (2013.01); *G06Q 20/40* (2013.01); *H04L 9/0869* (2013.01); *H04L 9/0872* (2013.01); *H04L 9/14* (2013.01); *H04L 9/30* (2013.01); *H04L 9/3297* (2013.01); *H04W 4/021* (2013.01); *H04W 4/20* (2013.01); *H04W 12/00502* (2019.01); *H04W 12/00503* (2019.01)

(58) Field of Classification Search
None
See application file for complete search history.

(56) References Cited

U.S. PATENT DOCUMENTS

| | | | | |
|---|---|---|---|---|
| 7,941,379 | B1 * | 5/2011 | Newstadt ............... | G06Q 20/40 705/50 |
| 9,408,025 | B2 * | 8/2016 | Brassil .................. | H04W 4/029 |

(Continued)

*Primary Examiner* — Kenny S Lin (57) ABSTRACT

Disclosed is a system and a method for authenticating the location of a user's communication device using a central server to a third party. The method and the system is a secure way to calculate the GPS location on a centralized server which is operating the Time and Place Decryption software that has one of its inputs being a Communication device transmitted encrypted prevailing code string which contains the original GPS coordinated representing the location and the Atomic time at which the encryption took place, as well as a combination of all or some other Knowledge, Ownership or Inheritance identification factors or tokens—FaktokIns. The more FaktokIns that are used in the encryption the harder it is to fake or replicate the GPSTOTP.

14 Claims, 8 Drawing Sheets

Related U.S. Application Data

(60) Provisional application No. 62/159,380, filed on May 11, 2015.

(51) Int. Cl.
| | |
|---|---|
| *G01S 19/01* | (2010.01) |
| *H04L 9/30* | (2006.01) |
| *H04L 9/08* | (2006.01) |
| *G01S 5/00* | (2006.01) |
| *G01S 19/14* | (2010.01) |
| *H04W 12/00* | (2009.01) |
| *H04W 4/20* | (2018.01) |

(56) References Cited

U.S. PATENT DOCUMENTS

| | | | |
|---|---|---|---|
| 9,723,436 B2 * | 8/2017 | Bedi | H04W 4/02 |
| 2002/0154777 A1 * | 10/2002 | Candelore | H04N 5/775 |
| | | | 380/258 |
| 2008/0112551 A1 * | 5/2008 | Forbes | H04W 76/10 |
| | | | 379/142.1 |
| 2008/0209521 A1 * | 8/2008 | Malaney | H04L 63/0492 |
| | | | 726/4 |
| 2009/0100530 A1 * | 4/2009 | Chen | H04L 9/3271 |
| | | | 726/29 |
| 2012/0191614 A1 * | 7/2012 | Babitch | G06Q 20/3829 |
| | | | 705/71 |
| 2014/0053250 A1 * | 2/2014 | Wethington | H04L 63/10 |
| | | | 726/5 |
| 2014/0357296 A1 * | 12/2014 | Deng | H04W 64/00 |
| | | | 455/456.1 |

* cited by examiner

| Phone Details, Encryption and GPSTOTP - for illustrative purposes only | | | | | | |
|---|---|---|---|---|---|---|
| TIME | GPS | | MOBILE NUMBER | SEED CODE | IMEI | Encryption-Used | GPS TIME CODE |
| | LONGITUDE | LATITUDE | | | | | |
| HAVE | HAVE | HAVE | HAVE | GENERATED | HAVE | n=1 | Example |
| | MSDISDN | | MSDISDN | | 15 NUMERICAL | SHA-1 | |
| 1:05:54 | 41:7:53:2187 | 82:5:49:0059 | +27614008290 | 98diudd8db | 1234567890 12345 | | 12345678901234500000 12a2d3f3f4g5fd4g6h6j4 |

FIG. 8

METHOD AND A SYSTEM FOR AUTHENTICATING AND IDENTIFYING THE LOCATION OF A COMMUNICATION DEVICE

CROSS REFERENCE TO RELATED APPLICATIONS

The present application claims priority under the laws and rules of the United States, including 35 USC § 120, and is a continuation in part patent application to the non-provisional U.S. patent application Ser. No. 15/151,528 filed on May 11, 2016 and claims priority and benefit under the laws and rules of the United States, including 35 USC § 120 to U.S. Further, the patent application number Ser. No. 15/151, 528 claims priority from U.S. provisional patent application 62159380, entitled 'A method and a system for determining hours worked and payment of wages of an employee on the basis of gps-time-code' filed May 11, 2015, the entire contents of which are incorporated herein by reference.

BACKGROUND OF THE INVENTION

1. Field of the Invention

The present invention generally relates to a method and a system for identifying the location of a communication device, and more particularly for calculating the time stamp inside a geo-fence location in order to authenticate transactions on the communication device.

2. Description of the Related Art

It is common for employees to "clock-in" and "clock-out" when checking in and checking out of work, such as when arriving at work, taking a lunch break and leaving for the day. Traditionally, the time and attendance system is usually mapped by signing into a record book. These traditional systems are now being replaced whereby employees log in a variety of mechanical devices such as via a time puncher machine/an inter networked or standalone GPS receiver or a standalone/networked biometric (Fingerprint, Iris Scan or Voice Recognition etc) reader or a Smart phone that records the GPS location of an employee.

Most of these systems require that these devices have access to high availability uptime networks and power so that this data can then be transmitted back to the employer in real time. It is normally a requirement that the employer requires a uniform system to operate his time and attendance requirements. This is mentioned because there are multiple work environment which often do not lend themselves to traditional time and attendance systems. Traditional clock in systems require power and high network availability, qualified staff to operate and maintain and normally cost a significant amount of money in hardware costs. A company can lose considerable amounts of money per year when employees arrive fifteen minutes late and leave fifteen minutes early, but do not reflect it on the written or electronic time sheets, and the possibility arises for recording a false time or location.

With the emergence of communication devices, many attendance systems are using GPS positioning sensors to try to confirm the location of the employee and duration on for example the job site. The requirement that the employer provide power, uptime, equipment and its maintenance is less important as this functionality is delivered by the employee in order for them to undertake their private communications.

However, current systems and methods do not provide authenticated positions of the employee which fails to keep a check where employees may be able to reconfigure the latitude, longitude and other phone details to mislead their employees. Therefore, there is a need of a system and a method which reads the location of the employee through a GPS Satellite system and not from the network router or the install position of the Biometric reader. Further, the system and the method should then encrypt this until it gets to the server to prevent spoofing, reconfiguration or forging.

SUMMARY OF THE INVENTION

In accordance with the teachings of the present invention, a method and a system for determining location of a user's communication device using communication device GPS Time Coding and its decoding on a server.

The present method and a system for calculating the GPS location on a centralized server which is operating the Time and Place (TAP) Decryption software that has one of its inputs being a Communication device transmitting encrypted languages such as Chinese Guobiao (GBn), Big5 (Taiwan, Hong Kong, Macau, Mainland China), Unicode, Ascii, UTF(n), DBCS code strings (Integers, Boolean, Characters, Floating Points, enumerated type, list or Arrays vectors or matrix or trees, or alphanumeric Strings) which contains the original GPS coordinated representing the location and the Atomic time at which the encryption took place, as well as a combination of all or some other FaktokIns (Knowledge, Ownership or Inheritance identification factors or tokens). The more FaktokIns that are used in the encryption the harder it is to fake or replicate the GPSTOTP.

These FaktokIns could consist of a multitude of variables combined on a communication device device with information on where and when the encryption took place. At the time of registering the service the following FaktokIns, along with the label, if they are to be relied on to provide a more secure time and place authentication grade, will need to be collected and shared between the server and the remote communication device device.

These FaktokIns are shared between the communication device and the server in an encrypted format.

A. These FaKtOkIns (Faktokins) consist of any or all of the following Knowledge (something only the user knows,) Ownership (something only the user possesses) or Inherence: (something the user is): i.e.

Static passwords, code, personal identification number; an IPVn—currently an IPv4 or IPv6-Internet Protocol address, token, smart card, mobile phone, Near Field Communications (NFC), PDF417 or Quick Response QR (bar coded Gov, Passport, employer issued driver license or Identification cards), Financial (Bank Account, Credit Card no, 3-D Secure, Mobile Airtime recharge Token, Gps (Global Position Satellite), Imei—international Mobile Equipment identity no of client device (e.g. Communication device). Mobile Number (MSISDN—Mobile Station International Subscriber Directory Number), license plate or vin number of motor vehicle, Digital Signature, Communication device sensors (Linear and other Accelerometers, gyroscope, magnetometer, Altitude, Light, gravity, Proximity, Global Positioning Satellites GPS (Longitude and Latitudes Coordinates), rotation, temperature, pressure, relative humidity, Bitcoins, Captcha, e-mandates, eWallets, stored value cards, and credit transfers, Public or Private Key, TLS, SSI, IPSEC or MD5 values, Biometric characteristic, such as genetic/DNA markers, fingerprints, Facial or handwriting recognition, Hand Geometry, Retina, Palm Vein Topology, Voice imprint, walking gait, typing rhythm, prisoner ankle bracelets or Exif (Exchangeable image Formats including Image sound or video recordings.

The GPSTOTP encryption and decryption process is as follows
1. Create Seed Code: Creating the Shared Secret on the Server or client Side.
2. Delivering Seed Code: Providing the Shared Secret to the client or server.
3. Communication device Device Client Imports the GPS and Atomic TIME and Generates an encrypted GPS Time Code IN combination with the specified number of authentication FaktokIns at the exact time.
4. Using decryption with the seed code as the unlocking key to authenticate or determine a client's time and location.

Another objective of the present invention is to provide a system for calculating the GPS location on a centralized server which is operating the Time and Place (TAP) Decryption software that has one of its inputs being a device transmitted encrypted Guobiao (GBn), Big5, Unicode, Ascii, UTF(n), DBCS code strings (Integers, Boolean, Characters, Floating Points, enumerated type, list or Arrays vectors or matrix or trees, or alphanumeric Strings) which contains the original GPS coordinated representing the location and the Atomic time at which the encryption took place.

As well as a combination of all or some other MALTOKINS (Multi-Factor, Area/Geofence, Location/GPS coordinates, Time, Ownership, Knowledge, Inheritance, Networks, Spoof Resistant) i.e.
1. Multi Factor, one or more of the following
2. Area (Geofence),
3. Location (GPS coordinates),
4. Time (Any of 32 or 64 bit Unix Time Code(UTC)/Atomic or its replacement),
5. Ownership—something you own Fob, Communication device, Sim Chip etc
6. Knowledge—something you know password ID, password no etc
7. Inheritance—from an originating Biometric Source i.e. human body characteristics, such as DNA, fingerprints, eye retinas and irises, voice facial and hand measurements etc.
8. Networks—GPS over Satellite, Pole/Building/Drone Sea Air Land and Space Craft mounted, Wifi, WAN, Lan, or other GPS emitting devices etc.
9. Spoof Resistant using
   a. Encryption Private and Public key encryption using existing RSA Diffie Hellman or any appropriate Elliptical Curve Cryptology encryption systems,
   b. GPS signal direction identification using directional antenna hardware and software
   c. GPS signal replacement detection, within an appropriate time interval—real-time or one which changes in any interval of per second or per minute etc.

The more MALTOKINS that are used in the encryption the harder it is to fake or replicate the MALTOKINS representing where and when the encryption took place. The MALTOKINS are represented by a GPSOTP which is a type of GPS Onetime password.

At the time of registering the service the following MALTOKINS, along with the label, if they are to be relied on to provide a more secure time and place authentication grade, will need to be collected and shared between the server and the remote device. These MALTOKINS are shared between the device and the server in an encrypted format.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF DRAWINGS

While this technology is illustrated and described in a preferred embodiment, a system and a method authenticating and identifying the location of a user's communication device using a central server for a third party may be produced in many different configurations, forms and computer languages. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
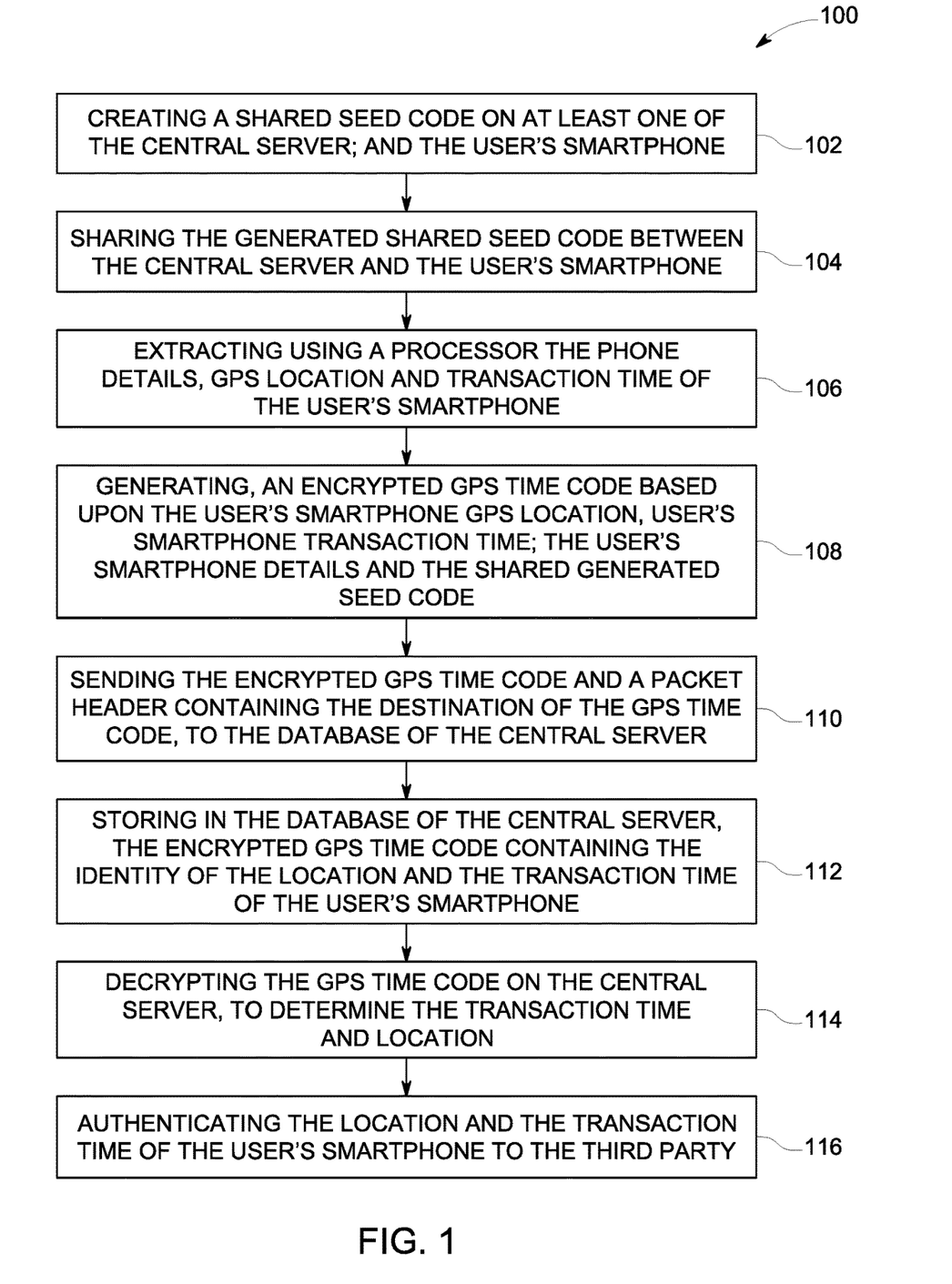
FIG. 1 illustrates a flowchart for illustrating a method for determining location of a user's communication device's using a central server in accordance with a preferred embodiment of the present invention.

FIG. 1 illustrates a flowchart for illustrating a method 100 for authenticating location of a user's communication device using a central server for a third party, in accordance with a preferred embodiment of the present invention. The method 100 initiates with a step 102 of creating a shared seed code on at least one of the central server and the user's communication device. In a preferred embodiment of the present invention, the shared seed code is known to the encryption software installed on the communication device at the time of setting up of the service and the decrypted central server and is therefore momentarily known by both the communication device software and the server software. Further in another preferred embodiment of the present invention, the seed-code may also be created at the user's communication device when it is not possible to communicate with the server.

The step 102 is then followed by a step 104 of sharing the shared seed-code between the central server and the user's communication device. In a preferred embodiment of the present invention, the seed code is shared either through online directly from the central server to the communication device or the seed code may be send after capturing it through a Quick Response Code (QR) using a communication device camera or scanner etc. However in another preferred embodiment of the present invention, the seed code is communicated or shared to the central server the first and only time the communication device makes connection with the central server.

The shared seed code is then saved at both in the communication device and in the database of the client server. All these communications and storage can be undertaken under the following hash-based message authentication codes securing Internet protocol suites (using cryptographic hash function MD5 or SHA-n) namely:

Transport Layer Security (TLS), and the Private Communications Transport (PCT) protocol are based on public key cryptography. The Security Channel (Schannel) authentication protocol suite provides these protocols.

Secure Sockets Layer (SSL) SSL is the standard security technology for establishing an encrypted link between a web server and a browser. This link ensures that all data passed between the web server and browsers remain private or Internet Protocol Security (IPsec). IPsec is a framework for a set of protocols for security at the network or packet processing layer of network communication The MD(n) Message-Digest algorithm is a widely used cryptographic hash function producing a 128-bit (16-byte) hash value, typically expressed in text format as a 32-digit hexadecimal number. In one case MD5 has been utilized in a wide variety of cryptographic applications and is also commonly used to verify data integrity.

The step 104 is then followed by a step 106 of extraction using a processor, phone details, GPS Location and transaction time of the user's communication device. In a preferred embodiment of the present invention, the communication device details include but are not limited to international Mobile Equipment identity No. (IMEI), Phone No. etc. The GPS location is determined through the communication device GPS sensor. The GPS location allows the central server to extract the communication device longitude and the latitude coordinates.

The communication device GPS works exactly like a standalone GPS, with the advantage that it has assisted GPS which helps it to speed up, using the mobile network, the initial GPS coordinates acquisition. The communication device shares the original shared seed code and remains synchronized with central server via at least two of a common synchronized constellation of available orbiting GPS satellites, the internal communication device processor clock, the network time of the Wi-Fi local area network (LAN) or wide area networks (WAN) of the network time of the mobile network.

The step 106 is then followed by a step 108 of generating an encrypted GPS time code (GPSTOTP) based upon user's communication device GPS location, user's communication device transaction time; the user's communication device details and the shared seed code. In a preferred embodiment of the present invention, the GPSTOTP is also encrypted to a predetermined SHA-n level to prevent it from being tampering with whilst it is stored in the user's communication device database awaiting the next opportunity to be transmitted when next online to the central server.

The step 108 is then followed by a step 110 of sending, with secure internet protocols, the encrypted GPS time code and a packet header containing the destination of the GPS time code, to the database of the central server. In a preferred embodiment of the present invention, the encrypted GPS time code and the packet header is send using the internet. Further, in another preferred embodiment, the GPS time code is written down or even faxed or posted to the central decryption server.

The step 110 is then followed by a step 112 of storing in the database of the central server, the encrypted GPS time code containing the identity of the location and the transaction time of the user's communication device. In a preferred embodiment of the present invention, the GPSTOTP is stored in an encrypted format and is decrypted only when the location for transaction is requested from the central server or requested by a third party for the purposes of determining the time and location of the transaction time.

The step 112 is then followed by a step 114 of decrypting the GPS time code on the central server, to determine the transaction time and location. In a preferred embodiment of the present invention, the decryption software has a common knowledge of the originating shared seed code as well as the synchronized time from where and when the encryption took place, as well as a combination of all or some other identification parameters where and when the encryption took place in a communication device.

The step 114 is then followed by a step 116 of authenticating the location and the transaction time of the user's communication device to the third party. In a preferred embodiment of the present invention, the decrypted location and time is supplied by sharing the seed code with network access to the central server with the third party so that they could undertake their own decryption of the data or by the delivery of the unencrypted data.

In another preferred embodiment of the present invention, the method 100 further includes the step of extracting user details from the user's communication device for embedding them in the GPS time code. In a preferred embodiment of the present invention, user details include but not limited to the name of the user, the fingerprint of the user, the ID proof of the user, the image of the user etc.

For exemplary purposes, third parties like companies who have sent a user/agent for marketing their product in a particular area, the method 100 helps that company to identify the real location of that agent at a particular time. Similarly, it would be known to those skilled in the art that the above method 100 to authenticate the location may be used for various purposes without deviating from the scope of the present invention.

The method 100 may be used by third parties to authenticate a financial transaction completed by the communication device. The method 100 for authenticating the financial transaction is explained in detail in conjunction with FIG. 2 of the present invention.

Figure 2:
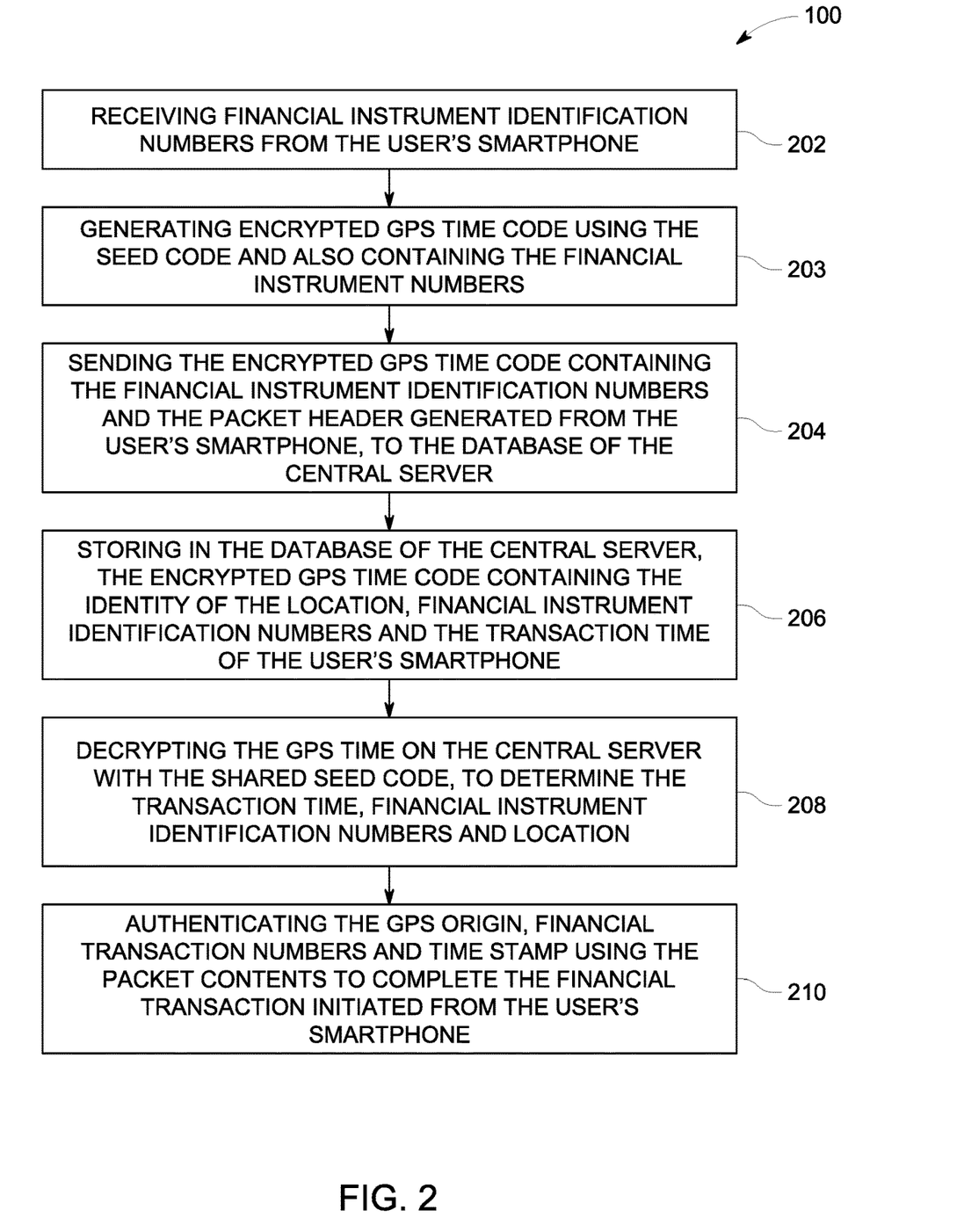
FIG. 2 illustrates a flowchart for illustrating a method for determining hour spends by one or more sub-users in pre-determined geo-fence location using a supervisor's communication device in accordance with another preferred embodiment of the present invention.

FIG. 2 illustrates a flowchart of a method 100 for authenticating a financial transaction initiated by the user's communication device and completed by the third party in another preferred embodiment of the present invention. The method 100 further includes a step 202 for receiving financial instrument identification numbers from the user's communication device. In a preferred embodiment of the present invention, the financial instrument could be a bank card detail, for example 12349 (n), associated with the user's communication device. However, it would be readily apparent to those skilled in the art that various types of financial instrument numbers may be envisioned without deviating from the scope of the present invention.

The step 202 is then followed by a step 203 of generating an encrypted GPS time code containing the financial instrument numbers. The step of generating encrypted GPS time code is explained in detail in conjunction with the step 108 of the FIG. 1 of the present invention.

The step 203 is then followed by a step 204 of sending, with secure internet protocols, the encrypted GPS time code containing the financial instrument identification numbers and the packet header generated from the user's communication device, to the database of the central server. In a preferred embodiment of the present invention, the encrypted GPS time code containing the financial instrument identification numbers and the packet header generated from the user's communication device is sent to the database of the central server. The sending step is explained in detail in conjunction with step 110 of FIG. 1 of the present invention.

The step 204 is then followed by a step 206 of storing in the database of the central server, the encrypted GPS time code containing the identity of the location, financial instrument identification numbers and the transaction time of the user's communication device. The origin of the packet helps the central server to know the location of the user communication device. The storing step is explained in detail in conjunction with step 112 of FIG. 1 of the present invention.

The step 206 is then followed by a step 208 of decrypting the GPS time on the central server, to determine the transaction time, financial instrument identification numbers and location using the seed code. The decryption step is explained in detail in conjunction with step 114 of FIG. 1 of the present invention. The step 208 is then followed by a step 210 of authenticating the GPS origin, financial transaction numbers and time stamp using the packet contents to complete the financial transaction initiated from the user's communication device. The decryption step is explained in detail in conjunction with step 116 of FIG. 1 of the present invention.

Figure 3:
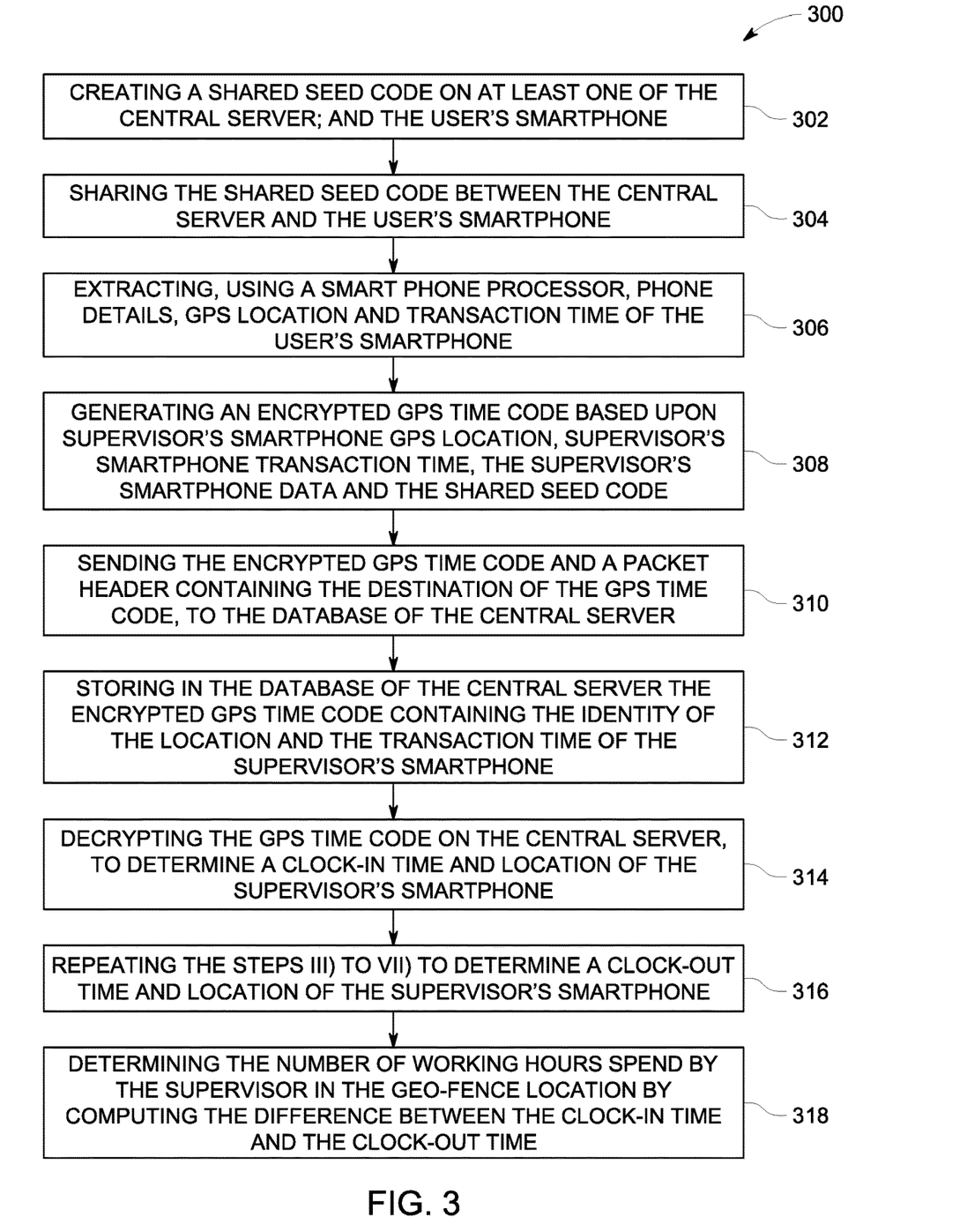
FIG. 3 illustrates a flowchart for illustrating a method for determining hours spend by one or more sub-users in pre-determined geo-fence location using a supervisor's communication device and by each sub-users phone, in a preferred embodiment of the present invention.

FIG. 3 illustrates a flowchart of a method 300 for determining hours spends by either the one or more sub-users or a supervisor in a pre-determined geo-fence location using a supervisor's communication device, in a preferred embodiment of the present invention. The method 300 initiates with a step 302 of creating a shared seed code on at least one of the central servers; and the user's communication device. The step 302 of creating the shared seed code is explained in detail in conjunction with the step 102 of FIG. 1 of the present invention. The geo-fence location is pre-determined to the central server.

The step 302 is then followed by a step 304 of sharing the generated shared seed code between the central server and the user's communication device. The step 304 of sharing the generated seed code is explained in detail in conjunction with the step 104 of FIG. 1 of the present invention. The step 304 is then followed by a step 306 of extracting using a processor, phone details, GPS location and transaction time of the user's communication device. The step 306 of extracting using a processor is explained in detail in conjunction with the step 106 of FIG. 1 of the present invention.

The step 306 is then followed by a step 308 of generating an encrypted GPS time code based upon the supervisor's communication device GPS location, supervisor's communication device transaction time, the supervisor's communication device data and shared generated seed code. The step 308 of generating encrypted GPS time code is explained in detail in conjunction with the step 108 of FIG. 1 of the present invention.

The step 308 is then followed by a step 310 of sending the encrypted GPS time code and a packet header, with secure internet protocols, containing the destination of the GPS time code, to the database of the central server. The step 310 of sending the encrypted GPS time code is explained in detail in conjunction with the step 110 of FIG. 1 of the present invention. The step 310 is then followed by a step 312 of storing in the database of the central server the encrypted GPS time code containing the identity of the location and the transaction time of the supervisor's communication device. The step 312 of storing in the database is explained in detail in conjunction with the step 112 of FIG. 1 of the present invention.

The step 312 is then followed by a step 314 of decrypting the GPS time code on the central server, to determine a clock-in time and location of the supervisor's communication device. In a preferred embodiment of the present invention, the clock-in time is recorded at the central server end. The clock-in time identifies the location of a person at the time of encrypting the code. The step 314 of decrypting the GPS time code is explained in detail in conjunction with the step 114 of FIG. 1 of the present invention.

The step 314 is then followed by a step 316 of repeating the steps 306 to 312 to determine a "clock-out" time and location of the supervisor's communication device. Similarly, on repeating the steps and going through the procedure, a clock-out time is determined to know when the supervisor has ended the work inside the geo-fence location. The clock-out time lets the central server know when the supervisor left work from inside the geo-fence location.

The step 316 is then followed by a step 318 of determining the number of working hours spend by the supervisor in the geo-fence location by computing the difference between the clock-in time and the clock-out time. In an exemplary embodiment, the clock-out time is 2:00 PM and the clock-in time is 8:00 AM, then the total working hours of the supervisor inside the geo-fence location is 6 hours.

In an exemplary embodiment, the method 300 may be used by government. bodies to control the attendance of teachers and employees inside a school boundary located at a remote site. The method 300 provides the most accurate way to determine the exact location and time of presence of the supervisor communication device in the location. However, it would be readily apparent to those skilled in the art that various applications of method 300 may be envisioned without deviating from the scope of the present invention.

Figure 4:
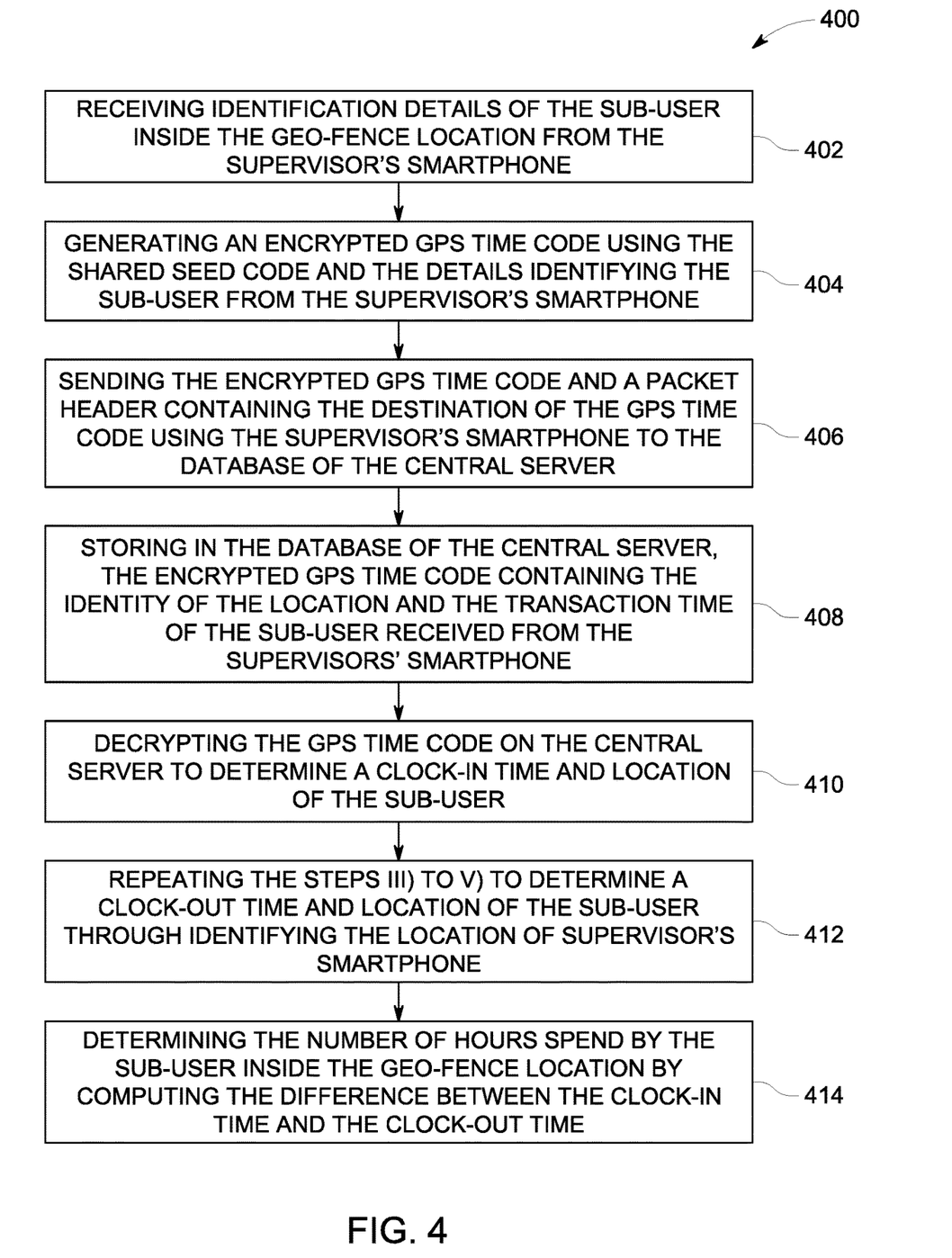
FIG. 4 illustrates a flowchart of a method for determining working hours spends by the sub-user in pre-determined geo-fence location using a supervisor's communication device in another preferred embodiment of the present invention.

FIG. 4 illustrates a flowchart of a method 400 for determining working hours spends by the sub-user in pre-determined geo-fence location using a supervisor's communication device in another preferred embodiment of the present invention. The method 400 allows for the monitoring of the attendance of each sub-user without each sub-user having a phone inside the geo-fence location.

The method 400 initiates with a step 402 of receiving identification details of the sub-user inside the geo-fence location from the supervisor's communication device. Examples of the identification details provided by the sub-user through the supervisor's communication device include but not limited to image of the sub-user, fingerprint of the sub-user, identity proof of the sub-user etc. The image is taken and the government or employee identity (ID) is scanned using the camera or the fingerprint is scanned using the supervisor communication device.

The step 402 is then followed by a step 404 of generating an encrypted GPS time code using the shared seed code and the details identifying the sub-user from the supervisor's communication device. The encrypted GPS time code contains the identification details of the sub-user. The step 404 of generating the encrypted GPS time code is explained in detail in conjunction with the step 108 of FIG. 1, the step 203 of FIG. 2 and the step 308 of FIG. 3 of the present invention.

The step 404 is then followed by a step 406 of sending the encrypted GPS time code and a packet header, with secure internet protocols, containing the destination of the GPS time code using the supervisor's communication device to the database of the central server. The step 406 of sending the encrypted GPS time code is explained in detail in conjunction with the step 110 of FIG. 1, the step 204 of FIG. 2 and the step 310 of FIG. 3 of the present invention.

The step 406 is then followed by a step 408 of storing in the database of the central server, the encrypted GPS time code containing the identity of the location and the transaction time of the sub-user received from the supervisors' communication device. This allows the central server to store time of entry of the sub-user inside the geo-fence location. The step 408 of storing in the database is explained in detail in conjunction with the step 112 of FIG. 1, the step 206 of FIG. 2, the step 312 of FIG. 3 of the present invention.

The step 408 is then followed by a step 410 of decrypting the GPS time code on the central server to determine a clock-in time and location of the sub-user. This allows the central server to determine the clock-in time of the sub-user inside the geo-fence location. The step 410 of decryption is explained in detail in conjunction of the step 114 of FIG. 1, the step 208 of FIG. 2 and the step 314 of FIG. 3 of the present invention.

The step 410 is then followed by a step 412 of repeating the steps 406 to 410 to determine a clock-out time and location of the sub-user through identifying the location of supervisor's communication device. This allows the central server to determine the clock-out time of the sub-user from the geo-fence location. The step 412 of determining the clock-out time is explained in detail in conjunction with the step 316 of FIG. 3 of the present invention.

The step 412 is then followed by a step 414 of determining the number of hours spend by the sub-user inside the geo-fence location by computing the difference between the clock-in time and the clock-out time. This allows the central server to determine the hours spend by the sub-user inside the geo-fence location. The step 414 of determining the number of hours is explained in detail in conjunction with the step 318 of FIG. 4 of the present invention.

Figure 5:
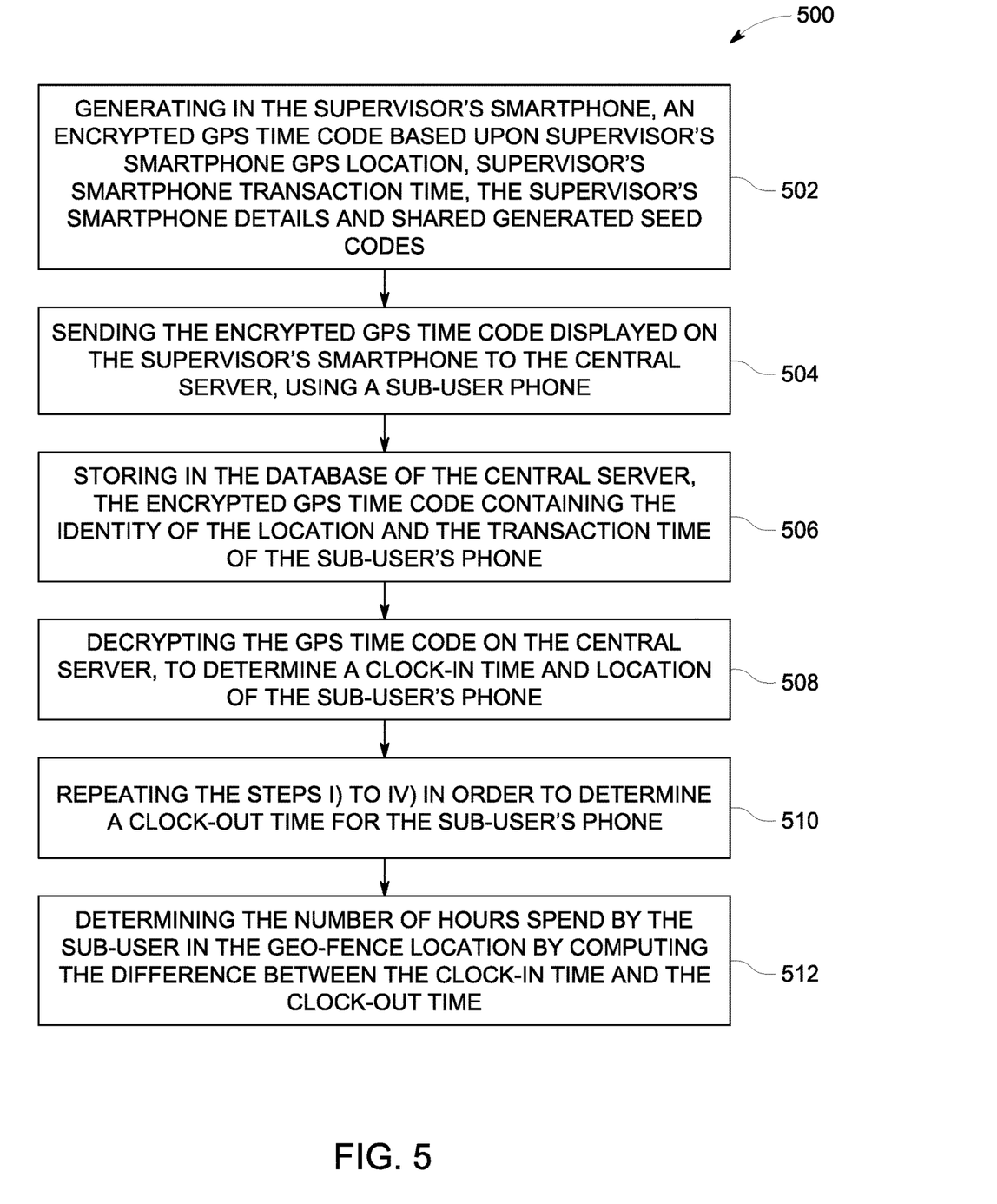
FIG. 5 illustrates a flowchart of a method of determining number of hours spends by a sub-user using a sub-user's phone on receiving the encrypted GPS time code on the supervisor's communication device.

FIG. 5 illustrates a flowchart of a method 500 of determining number of hours spends by a sub-user using a sub-user's phone on receiving the encrypted GPS time code on the supervisor's communication device. In a preferred embodiment of the present invention, the sub-user has a legacy phone but not necessarily a communication device that interacts with the central server via conventional networks (it is able to use USSD—Unstructured Supplementary Data network) Using this network they are still able to transmit the GPSTOTP code in a similar way that they currently purchase and activate airtime *shortcode* GPSTOTP code #.

The method 500 initiates with a step 502 of generating in the supervisor's communication device, an encrypted GPS time code based upon supervisor's communication device GPS location, supervisor's communication device transaction time, the supervisor's communication device details and shared generated seed codes. The step 502 of generating the GPS time code in the supervisor's phone is explained in detail in conjunction with the step 108 of FIG. 1, the step 203 of FIG. 2, the step 308 of FIG. 3 and the step 402 of FIG. 4, of the present invention.

The step 502 is then followed by a step 504 of sending, with secure internet protocols, the encrypted GPS time code displayed on the supervisor's communication device to the central server, using a sub-user phone. The sub-user may directly copy the GPS time code from the supervisor's phone or may further scan, using the camera, the GPS time code from the supervisor's phone to directly send the GPS time code to the central server. The step 504 of sending, with secure internet protocols, the encrypted GPS time code is explained in detail in conjunction with the step 110 of FIG. 1, the step 204 of FIG. 2, the step 310 of FIG. 3 and the step 406 of FIG. 4 of the present invention.

The step 504 is then followed by the step 506 of storing in the database of the central server, the encrypted GPS time code containing the identity of the location and the transaction time of the sub-user's phone. The central server then stores the identity and location of the sub-user through the sub-user's phone. The step 506 is explained in detail in conjunction with the step 112 of FIG. 1, the step 206 of FIG. 2, the step 312 of FIG. 3 and the step 408 of FIG. 4, of the present invention.

The step 506 is then followed by the step 508 of decrypting the GPS time code on the central server, to determine a clock-in time and location of the sub-user's phone. The step 508 to determine the clock-in time (time stamp) is explained in detail in conjunction with the step 114 of FIG. 1, the step 208 of FIG. 2, the step 314 of FIG. 3 and the step 410 of FIG. 4, of the present invention.

The step 508 is then followed by the step 510 of repeating the steps 502 to 508 in order to determine a clock-out time for the sub-user's phone. The step 510 to determine the clock-out time is explained in detail in conjunction with the step 316 of FIG. 3 and the step 412 of FIG. 4, of the present invention.

The step 510 is then followed by a step 512 of determining the number of hours spends by the sub-user in the geo-fence location by computing the difference between the clock-in time and the clock-out time. The step 512 is explained in detail in conjunction with the step 318 of FIG. 3 and the step 414 of FIG. 4, of the present invention.

Figure 6:
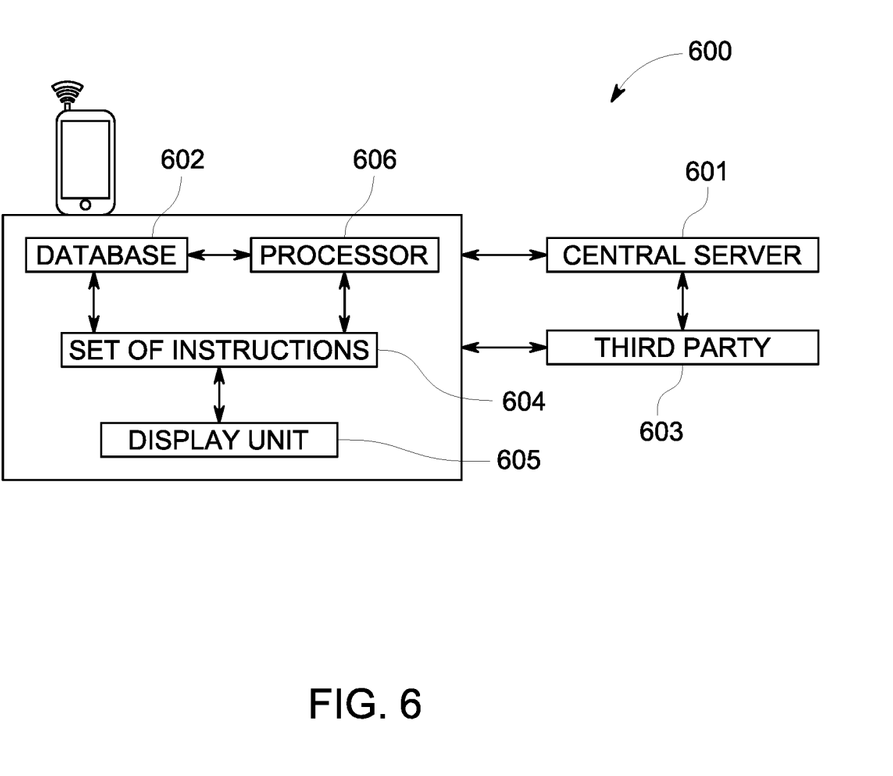
FIG. 6 illustrates a block diagram of a system for authenticating the location of a user's communication device using a central server for a third party in another preferred embodiment of the present invention.

FIG. 6 illustrates a block diagram of a system 600 for authenticating the location of a user's communication device using a central server 601 for a third party 603. The system 600 includes a database 602 for storing set of instructions 604 and a processor 606 coupled to the database 602 for processing the set of instructions 604. The set of instructions 604 are similar to the steps explained under method 100, method 200, method 300, method 400 and method 500 in FIG. 1, FIG. 2, FIG. 3, FIG. 4 and FIG. 5 respectively, of the present invention.

Figure 7:
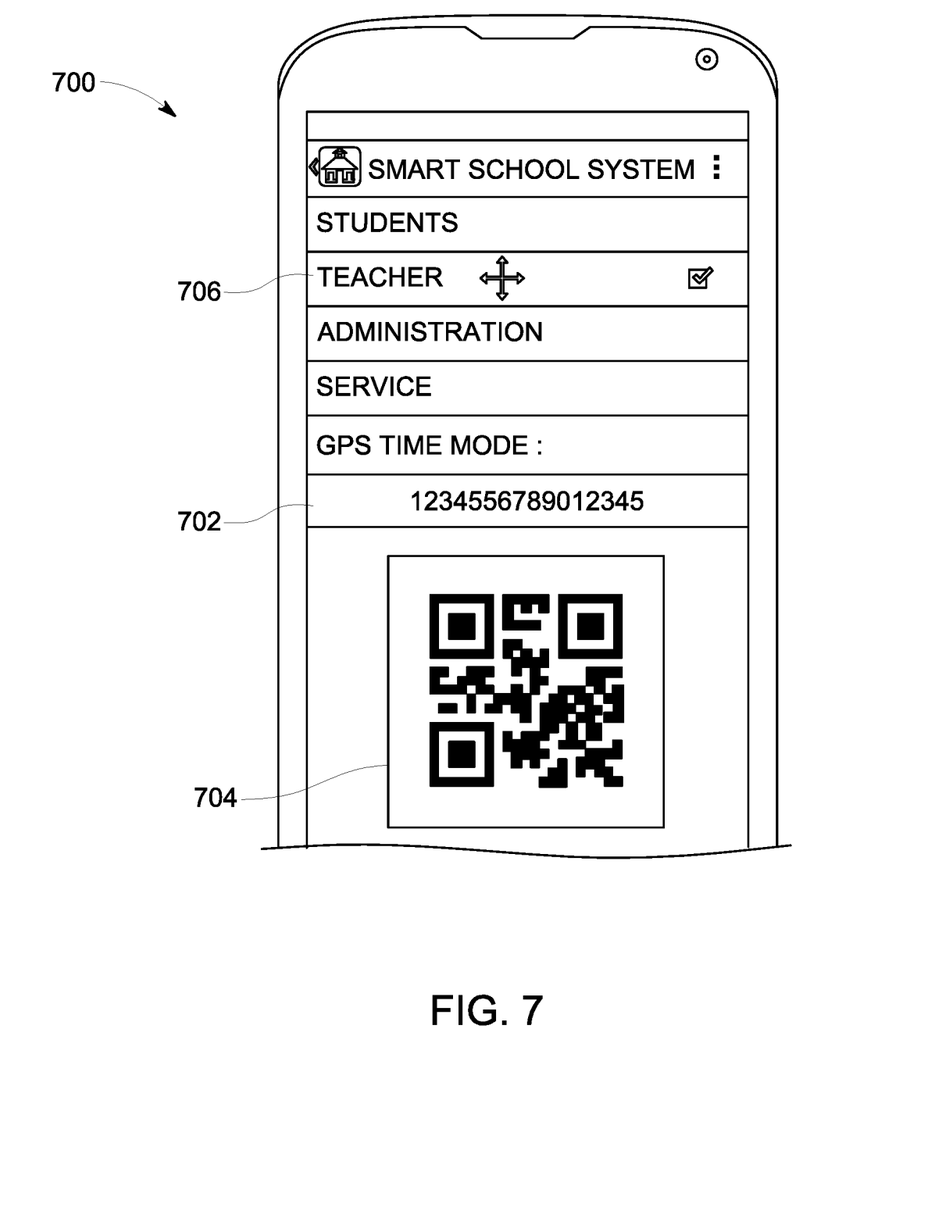
FIG. 7 illustrates a screenshot showing of a system for authenticating the location of teachers and students inside the boundary of the school in an exemplary embodiment of the present invention.

FIG. 7 illustrates a screenshot showing of a system 700 for authenticating the location of teachers and students inside the boundary of the school in an exemplary embodiment of the present invention. The system 700 is a smart school system. Herein, the screenshot shows the GPS time code 702 i.e. '1234556789012345' and the QR code 704 for a teacher 706 inside the school system in an exemplary embodiment of the present invention. Typically, a user scans the image of the QR code and is then send to the server. The server is able to retrieve the GPSTIME code from the QR code.

Figure 8:
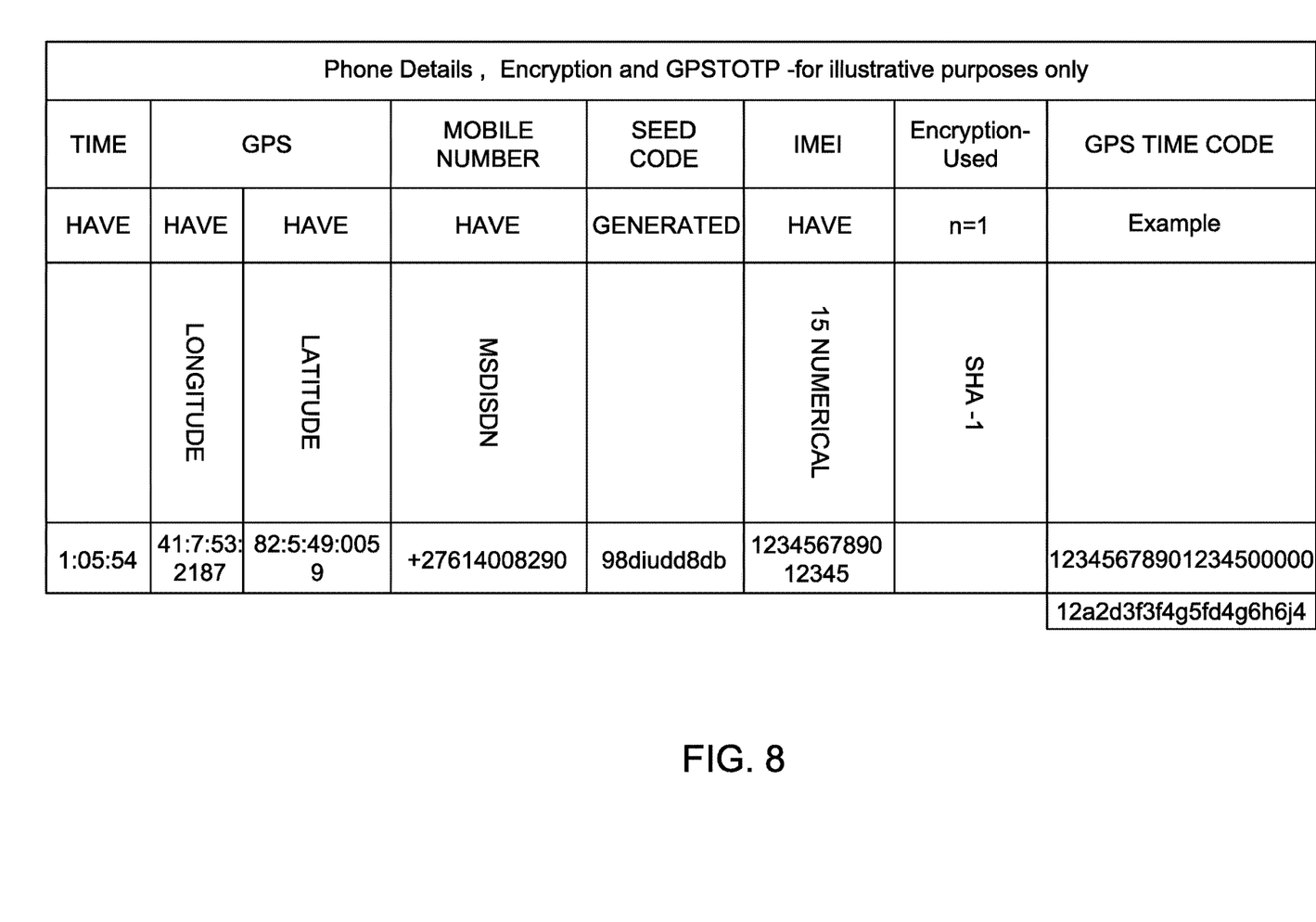
FIG. 8 illustrates block diagram to display the details of phone, encryption-used and GPSTIME CODE, in accordance with an exemplary embodiment of the present invention.

FIG. 8 illustrates block diagram to display the details of phone, encryption-used and GPSTIME CODE, in accordance with an exemplary embodiment of the present invention. The block diagram displays the example of GPSTIME time, GPS, Mobile No., Seed Code, IMEI, Encryption Used and GPSTIME Code. As shown for exemplary purposes:

| | |
|---|---|
| Time: 1:05:54 | MOBILE NO: (MSDISDN): +27614008290 |
| GPS Longitude: 41:7:53:2187 | IMEI (15 numerical): 123456789012345 |
| GPS Latitude: 82:5:49:0059 | SEED CODE (Generated): 98diudd8db |

Encryption-Used n=1-(SHA-1) [Based on the details above, the following GPS TIME Code/MALTOKINS is generated]

GPSTIMECODE: 123456789012345 00000 (numerical example) or 12a2d3f3f4g5fd4g6h6j4 (alpha-numeric example)

The above GPS TIME Code is then used to authenticate location of a user for a transaction made through a third party server.

Appended is the Table 1 to illustrate one of the exemplary embodiments of using MALTOKINS:

TABLE 1

| | | |
|---|---|---|
| TIME | HAVE | 1:05:54 |
| GPS | HAVE (LONGITUDE/ LATITUDE) | 41:7:53:2187/82:5:49:0059 |
| MOBILE NUMBER | HAVE (MSDISDN) | +27614008290 |
| SEED CODE | GENERATED | 98diudd8db |
| IMEI | HAVE (15 numerical) | 123456789012345 |
| ENCRYPTION USED | N = 1 (sha −1) | |
| Gpstimecode/ MALTOKINS | Example | 12345678901234500000 (12a2d3f3f4g5fd4g6h6j4) |

Below are examples of GPSTIME Code/MALTOKINS for internet traffic:

Secure Shell (SSH) KEYS

Current Required Formats (Prior-Art)

```
<protocol> <key-blob> username@example.com
``` or

```
<protocol> <key-blob> google-ssh
{"userName":"<username@example.com>","expireOn":"<date>"}
```

In preferred embodiment of the present invention, following are the exemplary formats for internet traffic.

Option 1

```
<protocol> <key-blob> google-ssh
{"userName":"<username@example.com>","expireOn":"<date>","gpstimecode":"<geofence>"}
```

Option 2

```
<protocol> <key-blob including gpstimecode / geofence> google-ssh
{"userName":"<username@example.com>","expireOn":"<date>"}
```

Option 3

```
<protocol> <key-blob including gpstimecode / geofence >
<username@example.com>
```

Application of GPSTime Code/MALTOKINS allows:
1. Geolocation by IP address as Confirmed with a GPSTime Code/MALTOKINS.
2. Comparison of the GPSTime Code/MALTOKINS IP address country with the billing address country
3. Check whether a free or anonymous e-mail address was used
4. Check whether an anonymous proxy server was used to place the order
5. Check whether the mailing address is a mailbox or ship-forward service
6. Check whether the phone number is valid and located within the correct ZIP code
7. Compare the credit card issuing bank's country with the billing address country
8. Do an online verification of GPSTime code/ MALTOKINS to verify the validity of credit card The present invention offers various advantages such as the following:
1. Provide a fall back manual authentication system—being able to write down the valid code or use legacy phones to transmit the GPSTOTP code/MALTOKINS.
2. The GPSTOTP code/MALTOKINS can also be printed on a roll and scanned back into a time and attendance system using the same device.
3. This solution is unique in that it is able to operate with or without networks and even in the case via a manual paper process.
4. Able to integrate to existing TOTP systems with little modification.
5. Further, the present invention does not require expensive GPS enabled phones and a wide area network all of which are not prevalent in rural areas.
6. Provides a counterfeit free system of determining the true location and time of a transaction
7. Factokins/MALTOKINS, as encrypted data, will only be accepted when they declare their true location and timestamp once decrypted. Some examples being:
   a. You will not be able to transact if you do not reveal your GPS location even if you attempt to fake your location.
   b. The seed code will become your true identity number only known to you and the Trusted authority who manages the GPSTOTP server.
   c. Being able to independently authenticate the position of an Airline without its GPS location being faked d. Credit card counterfeiters would not be able to fulfill a fraudulent transaction unless they revealed their true location.
e. One day terrorists will not be able to log into a network and receive an IP unless they declare their true location.
f. Documents will only be able to be electronically signed unless the parties reveal their true location and signature time.
g. Border control and access to a passport can only occur if it has a valid location
h. Bitcoins can only be traded if they attach their true GPS and timestamp location
i. Speed cameras can only record the true location, timestamp and velocity of a license plate.
j. You will not be able to buy, load or use airtime unless you reveal your true location.
k. Goods in transit will be unable to avoid liability for containers being opened and pilfered/exposed to light sensors or being dropped/exposed to gravity sensors as the true time and location will be recorded.

The foregoing discussion discloses and describes merely exemplary embodiments of the present invention. One skilled in the art will readily recognize from such discussion and from the accompanying drawings that various changes, modifications and variations may be made therein without departing from the spirit and scope of the invention. Therefore, it is intended that the invention not be limited to the particular embodiment disclosed, but that the invention will include all embodiments falling within the scope of the appended claims.

The invention claimed is:

1. A method for authenticating the location of a user's communication device using a central server for a third party, the method comprising the steps of:
   i) creating a shared seed code on at least one of the central server; and the user's communication device;
   ii) sharing the generated shared seed code between the central server and the user's communication device;
   iii) extracting using a processor the phone details, global positioning system (GPS) Location and transaction time from at least one of the user's communication device; satellite; and transmitter;
   iv) generating, an encrypted GPS time code based upon the user's communication device GPS location, user's communication device transaction time; the user's communication device details and the shared generated seed code;
   v) sending, with secure internet protocols, the encrypted GPS time code within a message containing the destination of the GPS time code, to the database of the central server;
   vi) storing in the database of the central server, the encrypted GPS time code containing the identity of the location and the transaction time of the user's communication device;
   vii) decrypting the GPS time code on the central server, to determine the transaction time and location; and
   viii) authenticating the location and the transaction time of the user's communication device to the third party.

2. The method according to claim 1 wherein further comprising the step of extracting the user details from the user's communication device for embedding them in the GPS time code.

3. The method according to claim 1 further comprising the step of:
   i. receiving financial instrument identification numbers from the user's communication device;
   ii. generating encrypted GPS time code using the seed code and also containing the financial instrument numbers;
   iii. sending, with secure internet protocols, the encrypted GPS time code containing the financial instrument identification numbers and the packet header generated from the user's communication device, to the database of the central server with secure internet protocols;
   iv. storing in the database of the central server, the encrypted GPS time code containing the identity of the location, financial instrument identification numbers and the transaction time of the user's communication device;
   v. decrypting the GPS time on the central server with the shared seed code, to determine the transaction time, financial instrument identification numbers and location; and
   vi. authenticating the GPS origin, financial transaction numbers and time stamp using the packet contents to complete the financial transaction initiated from the user's communication device.

4. A method for determining working hours spends by at least one of one or more sub-users; and a supervisor in pre-determined geo-fence location using a supervisor's communication device, the method comprising the steps of:
   i) creating a shared seed code on at least one of the central server; and the user's communication device;
   ii) sharing the shared seed code between the central server and the user's communication device;
   iii) extracting, using a smart phone processor, phone details, global positioning system (GPS) Location and transaction time of the user's communication device;
   iv) generating an encrypted GPS time code based upon supervisor's communication device GPS location, supervisor's communication device transaction time, the supervisor's communication device data and the shared seed code;
   v) sending, with secure internet protocols, the encrypted GPS time code and a packet header within secure internet protocols containing the destination of the GPS time code, to the database of the central server;
   vi) storing in the database of the central server the encrypted GPS time code containing the identity of the location and the transaction time of the supervisor's communication device;
   vii) decrypting the GPS time code on the central server, to determine a clock-in time and location of the supervisor's communication device;
   viii) repeating the steps iii) to vii) to determine a clock-out time and location of the supervisor's communication device; and
   ix) determining the number of working hours spend by the supervisor in the geo-fence location by computing the difference between the clock-in time and the clock-out time.

5. The method according to claim 4 further comprising the steps of:
   i) receiving identification details of the sub-user inside the geo-fence location from the supervisor's communication device;
   ii) generating an encrypted GPS time code using the shared seed code and the details identifying the sub-user from the supervisor's communication device;
   iii) sending, with secure internet protocols, the encrypted GPS time code and a packet header with secure internet protocols containing the destination of the GPS time code using the supervisor's communication device to the database of the central server;

iv) storing in the database of the central server, the encrypted GPS time code containing the identity of the location and the transaction time of the sub-user received from the supervisors' communication device;

v) decrypting the GPS time code on the central server to determine a clock-in time and location of the sub-user;

vi) repeating the steps iii) to v) to determine a clock-out time and location of the sub-user through identifying the location of supervisor's communication device; and vii) determining the number of hours spend by the sub-user inside the geo-fence location by computing the difference between the clock-in time and the clock-out time.

6. The method according to claim 5 further comprising the steps of:
   i. storing wages per hour of each sub-user in the database of the central server; and
   ii. determining by the central server, the wages of the sub-user by multiplying the number of the hours with the wages per hour of each sub-user.

7. The method according to claim 5 wherein the identification details of the sub-user comprising at least one of an image; a fingerprint; and a government/employee identification number.

8. The method according to claim 4 further comprising the step of:
   i) generating in the supervisor's communication device, an encrypted GPS time code based upon supervisor's communication device GPS location, supervisor's communication device transaction time, the supervisor's communication device details and shared generated seed codes;
   ii) sending, with secure internet protocols, the encrypted global positioning system (GPS) time code displayed on the supervisor's communication device to the central server, using a sub-user phone with secure internet protocols
   iii) storing in the database of the central server, the encrypted GPS time code containing the identity of the location and the transaction time of the sub-user's phone;
   iv) decrypting the GPS time code on the central server, to determine a clock-in time and location of the sub-user's phone;
   v) repeating the steps i) to iv) in order to determine a clock-out time for the sub-user's phone; and
   vi) determining the number of hours spend by the sub-user in the geo-fence location by computing the difference between the clock-in time and the clock-out time.

9. The method according to claim 8 further comprising the step of:
   i. storing wages per hour of each sub-user in the database of the central server; and
   ii. determining by the central server, the wages of the sub-user by multiplying the number of the hours with the wages per hour of each sub-user.

10. A system for authenticating the location of a user's communication device using a central server for a third party, the system comprising:
    a database for storing set of instructions;
    a display unit to display the set of instructions;
    a processor coupled to the database for processing the stored set of instructions, wherein the set of instructions comprising the steps of:
       i) creating a shared seed code on at least one of the central server; and the user's communication device;
       ii) sharing the generated shared seed code between the central server and the user's communication device;
       iii) extracting using a processor the phone details, global positioning system (GPS) Location and transaction no and time of the user's communication device;
       iv) generating, an encrypted GPS time code based upon the user's communication device GPS location, user's communication device transaction time; the user's communication device details and the shared generated seed code;
       v) sending, with secure internet protocols, the encrypted GPS time code and a packet header using secure internet protocols containing the destination of the GPS time code, to the database of the central server;
       vi) storing in the database of the central server, the encrypted GPS time code containing the identity of the location and the transaction time and number of the user's communication device;
       vii) decrypting the GPS time code on the central server, to determine the transaction time and location; and
       viii) authenticating the location and the transaction time of the user's communication device to the third party.

11. The system according to claim 10 wherein the set of instructions further comprising the step of extracting the user details from the user's communication device for embedding them in the GPS time code.

12. The system according to claim 10 wherein the set of instructions further comprising the steps of:
    receiving financial instrument identification numbers from the user's communication device;
    generating encrypted GPS time code using the seed code and also containing the financial instrument numbers;
    i. sending, with secure internet protocols, the encrypted GPS time code using secure protocols containing the financial instrument identification numbers and the packet header generated from the user's communication device, to the database of the central server;
    ii. storing in the database of the central server, the encrypted GPS time code containing the identity of the location, financial instrument identification numbers and the transaction time of the user's communication device;
    iii. decrypting the GPS time on the central server with the shared seed code, to determine the transaction time, financial instrument identification numbers and location; and
    iv. authenticating the GPS origin, financial transaction numbers and time stamp using the packet contents to complete the financial transaction initiated from the user's communication device.

13. The system according to claim 10 wherein the transaction time is at least one of a clock-in time; and a clock-out time of the user inside the geo-fence location.

14. The system according to claim 10 wherein the set of instructions further comprising the step of determining the number of working hours spend by the user in the geo-fence location by computing the difference between the clock-in time and the clock-out time.

* * * * *